United States Patent [19]

Kurokawa

[11] Patent Number: 5,261,823
[45] Date of Patent: Nov. 16, 1993

[54] ELECTRONIC LEARNING MACHINE WHICH IS CAPABLE OF GIVING LEARNING PROBLEMS MATCHING THE STUDENT'S SCHOLASTIC ABILITY

[75] Inventor: Yuji Kurokawa, Nagoya, Japan

[73] Assignee: Brother Kogyo Kabushiki Kaisha, Nagoya, Japan

[21] Appl. No.: 814,556

[22] Filed: Dec. 30, 1991

[30] Foreign Application Priority Data

Jan. 16, 1991 [JP] Japan ................................ 3-03169

[51] Int. Cl.⁵ ............................................... G09B 7/00
[52] U.S. Cl. .................................... 434/323; 434/322; 434/321; 434/350
[58] Field of Search ............... 434/350, 353, 321, 322, 434/323, 327, 307, 308, 118

[56] References Cited

U.S. PATENT DOCUMENTS

| | | | |
|---|---|---|---|
| 4,798,543 | 1/1989 | Spiece | 434/323 |
| 5,018,082 | 5/1991 | Obata et al. | 434/118 |
| 5,058,008 | 10/1991 | Schumacher | 434/118 |
| 5,065,345 | 11/1991 | Knowles et al. | 434/323 |

FOREIGN PATENT DOCUMENTS

| | | | |
|---|---|---|---|
| 0189673 | 7/1989 | Japan | 434/322 |
| 1-189682 | 7/1989 | Japan . | |
| 0062581 | 3/1990 | Japan | 434/322 |
| 0640354 | 12/1978 | U.S.S.R. | 434/350 |
| 0734795 | 5/1980 | U.S.S.R. | 434/350 |
| 0873263 | 10/1981 | U.S.S.R. | 434/327 |
| 1531124 | 12/1989 | U.S.S.R. | 434/321 |

Primary Examiner—Jessica Harrison
Attorney, Agent, or Firm—Oliff & Berridge

[57] ABSTRACT

An electronic learning machine having an input unit for inputting data relating to a specific student. When the data relating to the student is entered by the input unit, a select unit selects the scholastic achievement data related to the student from a first storage unit. A control unit then selects, when so directed, problem information matching the student's scholastic ability from problem information at all difficulty levels stored in a second storage unit and displays the selected problems on the display or on a printing paper. Thus, the student is faced with problems at a difficulty level matching his/her scholastic ability to enhance learning.

13 Claims, 13 Drawing Sheets

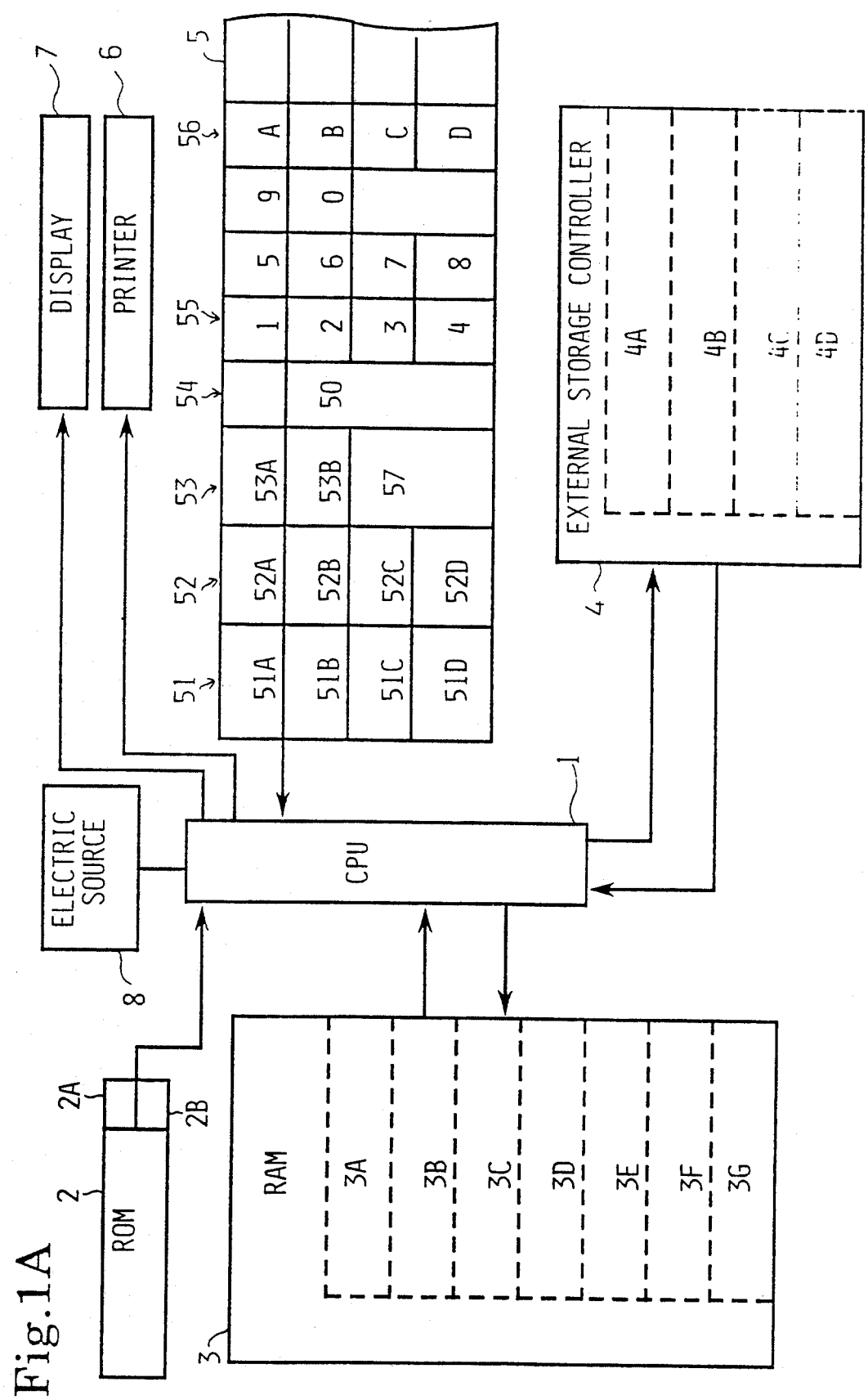

Fig.1B

| 2A | CHARACTER GENERATOR FOR THE PRINTER |
|----|---------------------------------------|
| 2B | CHARACTER GENERATOR FOR THE DISPLAY DEVICE |
| 3A | PROBLEM ISSUING PROGRAM AREA |
| 3B | TEACHING MATERIAL DATA WORKING AREA |
| 3C | SCHOLASTIC ACHIEVEMENT MANAGEMENT PROGRAM AREA |
| 3D | SCHOLASTIC ACHIEVEMENT DATA WORKING AREA |
| 3E | INPUT INFORMATION WORKING AREA |
| 3F | DATA EDIT AREA |
| 3G | VISUAL RAM AREA |
| 4A | PROBLEM ISSUING PROGRAM AREA |
| 4B | TEACHING MATERIAL DATA FILE |
| 4C | SCHOLASTIC ACHIEVEMENT MANAGEMENT PROGRAM AREA |
| 4D | SCHOLASTIC ACHIEVEMENT MANAGEMENT FILE |
| 5  | KEYBOARD |

Fig.2B

| | |
|---|---|
| S1 | HAS SCHOLASTIC ACHIEVEMENT INFORMATION BEEN ENTERED? |
| S2 | ENTER STUDENT IDENTIFICATION NUMBERS |
| S3 | ENTER STUDENT INFORMATION AND SCHOLASTIC ACHIEVEMENT INFORMATION |
| S4 | CHANGE |
| S5 | HAS PROBLEM ISSUING PROCESS BEEN EXECUTED? |
| S6 | ENTER STUDENT IDENTIFICATION NUMBERS AND SUBJECT CODES |
| S7 | READ SCHOLASTIC ACHIEVEMENT INFORMATION |
| S8 | READ RELEVANT TEACHING MATERIAL DATA |
| S9 | ANY UNPROCESSED SUBJECT CODE? |
| S10 | ANY UNPROCESSED STUDENT IDENTIFICATION NUMBER? |
| S11 | DISPLAY MODE? |
| S12 | DISPLAY TEACHING MATERIAL DATA |
| S13 | PRINT OUT TEACHING MATERIAL DATA |
| S14 | END? |

Fig.3

```
FUNCTION SELECT MENU

MOVE THE CURSOR TO A DESIRED MENU ITEM AND PRESS ENTER o  ┌─────────────────────────────────────┐
       │ SCHOLASTIC ACHIEVEMENT MANAGEMENT   │
       └─────────────────────────────────────┘ o     PROBLEM ISSUANCE o     END
```

Fig.4

```
FUNCTION SELECT MENU

TYPE STUDENT IDENTIFICATION NUMBER ( ┌──────┐ )
           │ 3110 │
           └──────┘
```

Fig.5

SCHOLASTIC ACHIEVEMENTS

SCHOOL YEAR: ____  CLASS: ____  STUDENT ID No.: ____  NAME: ____

| SUBJECT CODES | SUBJECTS | GRADE |
|---|---|---|
| 0301 | SQUARE ROOT | - |
| 0302 | MULTIPLICATION OF POLYNOMINALS | - |
| 0303 | FACTORIZATION | - |
| 0304 | QUADRATIC EQUATIONS | - |
| 0305 | FUNCTIONS | - |
| 0306 | CIRCLES AND LINES | - |
| 0307 | ANGLE OF CIRCUMFERENCE | - |
| 0308 | THEOREM OF THREE SQUARES | - |
| 0309 | SIMILARITY AND CALCULATION | - |
| 0310 | PROBABILITY | - |
| 0311 | SAMPLE SURVEY | - |

GRADES

5 ...EXCELLENT
4 ....GOOD
3 ....MEDIOCRE
2 ....FAIR
1 ....BAD
- ....NO DATA

Fig.6

SCHOLASTIC ACHIEVEMENTS

SCHOOL YEAR: 3    CLASS: 1    STUDENT ID No.: 3110    NAME: TARO YAMAKAWA

| SUBJECT CODES | SUBJECTS | GRADE |
|---|---|---|
| 0301 | SQUARE ROOT | 4 |
| 0302 | MULTIPLICATION OF POLYNOMINALS | 4 |
| 0303 | FACTORIZATION | 4 |
| 0304 | QUADRATIC EQUATIONS | 4 |
| 0305 | FUNCTIONS | 3 |
| 0306 | CIRCLES AND LINES | 3 |
| 0307 | ANGLE OF CIRCUMFERENCE | - |
| 0308 | THEOREM OF THREE SQUARES | - |
| 0309 | SIMILARITY AND CALCULATION | - |
| 0310 | PROBABILITY | - |
| 0311 | SAMPLE SURVEY | - |

GRADES

5 ....EXCELLENT
4 .... GOOD
3 .... MEDIOCRE
2 .... FAIR
1 .... BAD
-  .... NO DATA

Fig.7

SCHOLASTIC ACHIEVEMENTS

SCHOOL YEAR: 3　　　CLASS: 1　　　STUDENT ID No.: 3111　　　NAME: JIRO YAMADA

| SUBJECT CODES | SUBJECTS | GRADE |
|---|---|---|
| 0301 | SQUARE ROOT | 2 |
| 0302 | MULTIPLICATION OF POLYNOMINALS | 2 |
| 0303 | FACTORIZATION | 3 |
| 0304 | QUADRATIC EQUATIONS | 3 |
| 0305 | FUNCTIONS | 3 |
| 0306 | CIRCLES AND LINES | - |
| 0307 | ANGLE OF CIRCUMFERENCE | - |
| 0308 | THEOREM OF THREE SQUARES | - |
| 0309 | SIMILARITY AND CALCULATION | - |
| 0310 | PROBABILITY | - |
| 0311 | SAMPLE SURVEY | - |

GRADES

5 .... EXCELLENT
4 .... GOOD
3 .... MEDIOCRE
2 .... FAIR
1 .... BAD
- .... NO DATA

Fig.8

```
              PROBLEM REQUEST MENU.
STUDENT ID No.    [ 3110 ] [ 3111 ] [      ] [      ]
                  [      ] [      ] [      ] [      ]
SUBJECT CODE      [ 0301 ] [ 0305 ] [      ] [      ]
                  [      ] [      ] [      ] [      ]
```

Fig.9

GRADES OF STUDENT'S SCHOLASTIC ACHIEVEMENTS
AND THE CORRESPONDING DIFFICULTY LEVELS OF PROBLEMS

| GRADES | DIFFICULTY LEVEL |
|--------|------------------|
| 5 | 3 |
| 4 | 3 |
| 3 | 2 |
| 2 | 1 |
| 1 | 1 |

Fig.10

CONTENTS OF TEACHING MATERIAL DATA FILE

| PROBLEM Nos. | SUBJECT CODES | DIFFICULTY LEVELS | TEACHING MATERIAL DATA |
|---|---|---|---|
| 0101 | 0301 | 1 | ---- |
| 0102 | 0301 | 1 | |
| 0103 | 0301 | 1 | |
| ---- | | | |
| 0113 | 0305 | 1 | |
| ---- | | | |
| 0201 | 0301 | 2 | |
| 0202 | 0301 | 2 | |
| 0203 | 0301 | 2 | |
| 0204 | 0301 | 2 | |
| ---- | | | |
| 0222 | 0305 | 2 | |
| ---- | | | |
| 0301 | 0301 | 3 | |
| 0302 | 0301 | 3 | |
| 0303 | 0301 | 3 | |
| 0304 | 0301 | 3 | |
| ---- | | | |
| 0315 | 0305 | 3 | |
| ---- | | | |

DIFFICULTY LEVELS
1: BASIC PROBLEMS (EASY)
2: APPLIED PROBLEMS (AVERAGE)
3: ADVANCED PROBLEMS (DIFFICULT)

Fig.11

```
PROBLEM OUTPUT MODE SELECT MENU
  ° DISPLAY MODE → PRESS THE DISPLAY KEY
  ° PRINT MODE → PRESS THE PRINT KEY
```

Fig.12

(1) $2\sqrt{3} \times \sqrt{6} \times \sqrt{14}$ (2) $5\sqrt{3} \div \sqrt{15} \div \sqrt{2}$ (3) $3\sqrt{3} - \sqrt{4} + \sqrt{108} + 1$ (4) $\dfrac{1}{\sqrt{2}} + \dfrac{\sqrt{2}}{\sqrt{3}} - \dfrac{1}{\sqrt{6}}$ (5) $\sqrt{20} - \sqrt{5}(2 - \sqrt{5})$

Fig.13

0301,0305  ACHIEVEMENT TEST

SCHOOL YEAR: 3   CLASS: 1   3110   TARO YAMAKAWA 1. (0301) ARRANGE THE FOLLOWING VALUES IN DESCENDING ORDER USING INEQUALITY SIGNS.
   $7/8, \sqrt{7/8}, \sqrt{7}/8, 7/2\sqrt{2}$ 2. (0302) ANSWER THE QUESTIONS.
   (1) FIND OUT THE SQUARE ROOT.  $81/121$
   (2) EXPRESS THE POSITIVE SQUARE ROOT OF 1.75 BY USING A ROOT SIGN WITH THE LEAST POSSIBLE INTEGERS.
   (3) FIND OUT THE VALUE OF $\sqrt{(-7)^2}$.

3. (0303) FIND OUT THE APPROXIMATE VALUE OF $6/\sqrt{0.3}$ BY USING $\sqrt{3} = 1.732$ AND $\sqrt{30} = 5.477$.

4. (0304) CALCULATE THE FOLLOWING. DENOMINATORS MUST BE RATIONALIZED.

(1) $2\sqrt{3} \times \sqrt{6} \times \sqrt{14}$ (2) $5\sqrt{3} \div \sqrt{15} \div \sqrt{2}$ (3) $3\sqrt{3} - \sqrt{4} + \sqrt{108} + 1$ (4) $1/\sqrt{2} + \sqrt{2/3} - 1/\sqrt{6}$ (5) $\sqrt{20} - \sqrt{5}(2 - \sqrt{5})$ (6) $(1 + \sqrt{6})/\sqrt{24} - (\sqrt{2} - \sqrt{3})/\sqrt{3}$ (7) $\sqrt{12}/3 + \sqrt{6}/\sqrt{2} - 2/\sqrt{3}$ 5. (0222) DEFINE THE RANGE OF THE FOLLOWING FUNCTIONS FOR $-2 \leq X \leq 5$ (1) $Y = 9 - 3X$       (2) $Y = -2X^2$

Fig.14

0301,0305  ACHIEVEMENT TEST

SCHOOL YEAR: 3   CLASS: 1   3111   JIRO YAMAKAWA 1. (0101) ANSWER THE QUESTIONS.
   (1) FIND OUT THE SQUARE ROOT OF 0.36
   (2) REMOVE THE ROOT SIGN. $\sqrt{9/16}$
   (3) FIND OUT THE INTEGRAL PART OF $\sqrt{154}$
   (4) FIND OUT THE APPROXIMATE VALUE OF $\sqrt{0.5}$ BY USING $\sqrt{5} = 2.236$ AND $\sqrt{50} = 7.071$
   (5) FIND OUT ALL THE ONE PLACE NATURAL NUMBERS FOR X TO MAKE $\sqrt{32X}$ A NATURAL NUMBER.

2. (0102) ANSWER THE QUESTIONS.
   (1) RATIONALIZE THE DENOMINATOR OF $(\sqrt{50} - \sqrt{6})/\sqrt{2}$.
   (2) ARRANGE $5/3$, $\sqrt{5}/\sqrt{3}$, $\sqrt{5}/3$ AND $5/\sqrt{3}$ IN DESCENDING ORDER.
   (3) FIND OUT THE APPROXIMATE VALUE OF $10/\sqrt{5}$ BY USING $\sqrt{5} = 2.236$ 3. (0103) CALCULATE THE FOLLOWING.
   (1) $\sqrt{5} \times \sqrt{7}$                (2) $\sqrt{6} \times \sqrt{12}$
   (3) $\sqrt{12} \div \sqrt{6}$                (4) $3\sqrt{2} \times \sqrt{3} \div 2\sqrt{2}$
   (5) $5\sqrt{6} + \sqrt{6}$                   (6) $3\sqrt{6} - \sqrt{54} + \sqrt{36}$
   (7) $21/\sqrt{7} - \sqrt{28}/2 + 2\sqrt{21}/\sqrt{3}$   (8) $\sqrt{8}(\sqrt{6} + \sqrt{32}) - (-\sqrt{7})^2$ 4. (0222) DEFINE THE RANGE OF THE FOLLOWING FUNCTION FOR $-2 \leq X \leq 5$.
   (1) $Y = 9 - 3X$        (2) $Y = -2X^2$

ELECTRONIC LEARNING MACHINE WHICH IS CAPABLE OF GIVING LEARNING PROBLEMS MATCHING THE STUDENT'S SCHOLASTIC ABILITY

BACKGROUND OF THE INVENTION

1. Field of the Invention

The invention relates to an electronic learning machine and, more particularly, to an electronic learning machine which is capable of giving learning problems divided by difficulty level to a student to improve the student's scholastic abilities.

2. Description of the Prior Art

The conventional electronic learning machine can give learning problems to a student so as to improve the student's scholastic ability. However, the conventional electronic learning machine is not produced so that the learning machine takes into consideration the student's scholastic ability. As a result, the electronic learning machine gives predetermined standard learning problems to the student irrespective of his/her scholastic abilities.

However, students have different scholastic abilities. Learning problems appropriate to superior students having have high scholastic abilities (difficult learning problems) are too difficult for less gifted students having low scholastic abilities and will undermine their desire to learn. Whereas learning problems appropriate to the skills of the less gifted students (easy learning problems) are too easy and uninteresting to the superior students thereby depriving the superior students of the opportunity to wrestle with problems appropriate to their higher difficulty level of learning.

Hence, a teacher in charge of the student needs to select learning problems from a plurality of learning problems having different levels of difficulty taking into consideration each student's scholastic ability when the teacher and the students use the electronic learning machine. On the other hand, it is extremely difficult for the teacher to select problems to match the skills of each student because selecting problems to match the skills of each student requires intolerably excessive expenditures of time and labor. As a result, the teacher gives a number of the learning problems having different levels of difficulty to all students even though they differ from one another in their scholastic ability.

A group of engineers, including an inventor of this invention, developed a new electric learning machine, disclosed in Japanese unexamined patent publication No. 189682-89 (published Jul. 28, 1989). Their electric learning machine has a function which limits the easy learning problems to the less gifted students to prevent a waste of time for the superior students. This is done by the electric learning machine obtaining data relating to the scholastic achievement of each student to specified learning problems by giving the specified learning problems to the students and checking right and wrong answers.

However, the electric learning machine having this function is not suitable for the less gifted students because it presents the less gifted student with considerable problems because of the different levels of learning that include difficult learning problems. In this case, the electric learning machine may again defeat the desire to learn, as the less gifted students wrestle with many problems including problems at higher difficulty levels of learning.

SUMMARY OF THE INVENTION

The invention has been made to solve the foregoing problems and it is therefore an object of the present invention to provide an improved electronic learning machine which is suitable for less gifted students who have low scholastic abilities.

Another object of the invention is to provide an electronic learning machine which is capable of presenting learning problems matching the student's scholastic abilities.

To attain the above objects, the electronic learning machine of the invention comprises:

an input unit for inputting data relating to a specific student;

first storage unit for storing scholastic attainment data relating to scholastic attainments of a plurality of students including the specific student;

a selecting unit for selecting scholastic attainment data relating to the scholastic attainments of the specific student from the first storage unit in accordance with the input data by the input unit;

a second storage unit for storing problem data relating to a plurality of learning problems having different levels of learning in relation to difficulty level information which indicates difficulty level of learning concerning the learning problems;

an indicating unit for indicating problem data relating to the learning problems; and a control unit for selecting the problem data relating to the learning problems matching the specified student's scholastic ability and giving the data relating to the selected learning problems to the indicating unit in accordance with the difficulty level information and the selected data by the selecting unit.

When the input data relating to the specific student is entered by the input unit, the selecting unit selects the scholastic attainment data relating to scholastic achievement concerning the student from the first storage unit. The control unit selects problem data relating to learning problems matching the student's scholastic ability from among problem data relating to the problems stored in the second storage unit according to the difficulty level information and the selected scholastic achievement information, and indicates the selected problems on the indicate means, such as a display or a printing paper. Thus, the student is able to deal with problems of a difficulty level matching the student's scholastic ability thereby fostering efficient learning.

BRIEF DESCRIPTION OF THE DRAWINGS

The above and other objects, features and advantages of the invention will become more apparent from the following description taken in connection with the accompanying drawings, in which:

FIGS. 1A and 1B are a block diagram and a table of labels, respectively, showing an electronic learning machine in a preferred embodiment according to the invention;

FIGS. 2A and 2B are a flow chart and a table of labels, respectively, showing the operation of the electronic learning machine of FIGS. 1A and 1B;

FIG. 3 is a view of a display screen showing a function select menu;

FIG. 4 is a view of the display screen showing a prompt message requesting the student to enter a student identification number;

FIG. 5 is a view of the display screen showing a table for entering the student's scholastic achievement information;

FIG. 6 is a view of the display screen showing another table for entering the student's scholastic achievement information;

FIG. 7 is a view of the display screen showing a further table for entering the student's scholastic achievement information;

FIG. 8 is a view of the display screen showing a problem selection menu requiring "entering a student identification number and subject codes";

FIG. 9 is a table showing grades of student's scholastic achievements and the corresponding difficulty levels of problems;

FIG. 10 is a view showing the contents of a teaching material data file;

FIG. 11 is a view of the display screen showing a problem output selection menu;

FIG. 12 is a view of problems displayed on the display screen;

FIG. 13 is a view of problems printed on a sheet; and

FIG. 14 is a view of problems printed on a sheet.

DESCRIPTION OF THE PREFERRED EMBODIMENT

Figure 2A:
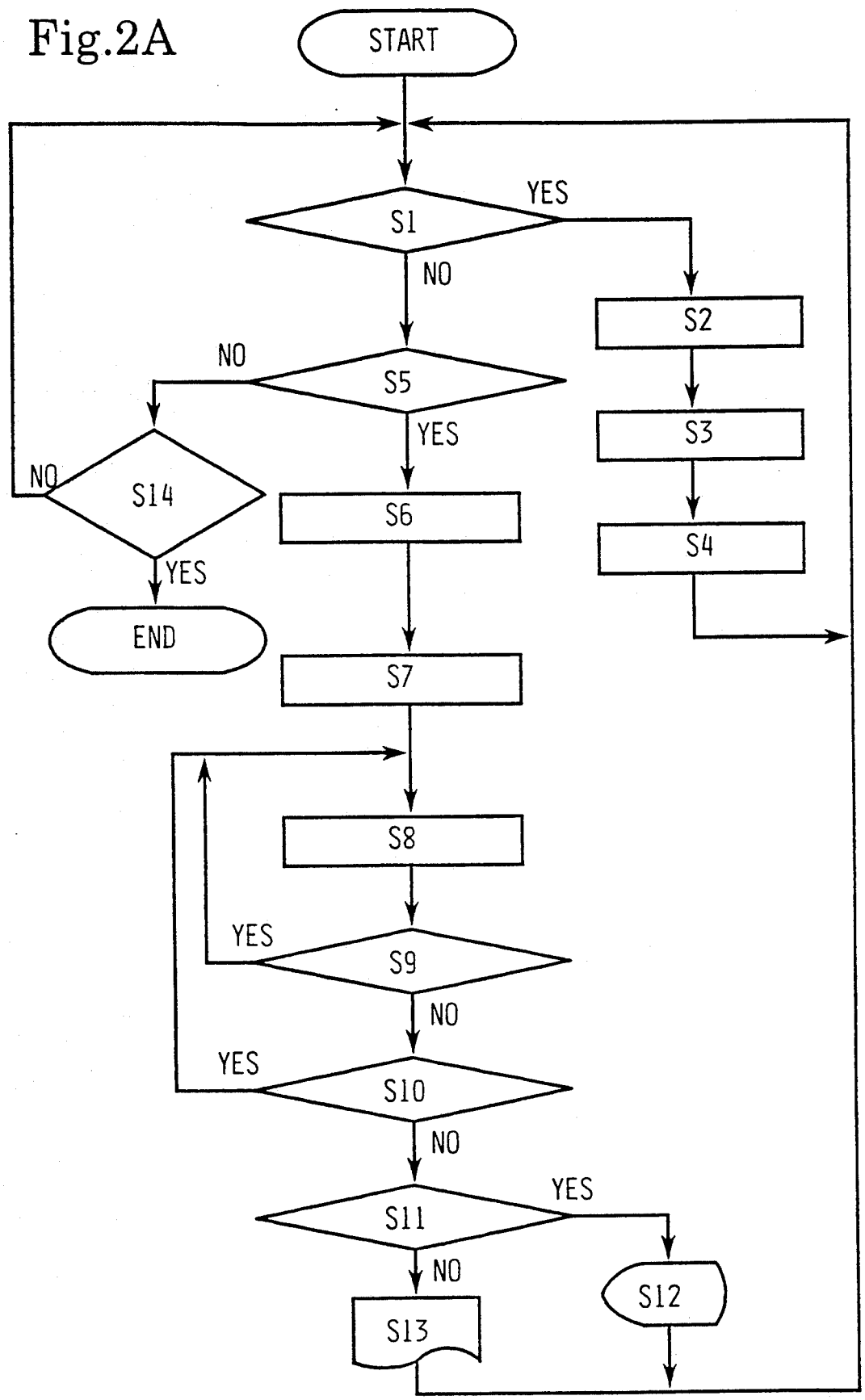

Referring to FIG. 1, an electronic learning machine in a preferred embodiment according to the invention comprises a CPU 1, a ROM 2, a RAM 3, a nonvolatile read/write external storage 4, a keyboard 5, a printer 6, a display device 7 and an electric source 8. The CPU 1 is electrically connected to the ROM 2, the RAM 3, the nonvolatile read/write external storage 4, the keyboard 5, the printer 6 and the display device 7 so that data are transmitted among the components.

The keyboard 5 is provided with a power source setting key 50 for turning on and off the electric source 8 of the machine, function keys 51, cursor movement keys 52, scroll keys 53, an enter key 54, numeric keys 55 for entering a student identification number and a subject code, character keys 56 for entering a student's name and a cancel key 57. The function keys 51, such as a problem request key 51A, a solution request key 51B, a print select key 51C and a display select key 51D, are used for selecting functions displayed on a select line on the display device 7. The numeric keys 55 function as input means, such as for entering a student identification number.

The cursor movement keys 52 include a cursor up key 52A, a cursor down key 52B, a cursor left key 52C and a cursor right key 52D for moving cursors displayed on the screen of the display device 7. The scroll keys 53 include an up scroll key 53A for scrolling a page displayed on the screen of the display device 7 upward and a down scroll key 53B for scrolling the page downward. The enter key 54 is used for selecting items of menus and executing functions.

The printer 6 is a known serial thermal dot type and can print data, such as learning problem data, on a paper with a thermal ink ribbon in accordance with reciprocating movement of the printhead in a direction parallel to the width of the paper. A laser printer 6, a wire dot-wire type printer, or any other conventional printer may be used in place of the serial thermal dot type printer. The display device 7 is a known CRT display and displays image data, such as learning problem data, on the screen. A liquid display may be used in place of the CRT display. The display device 7 and the printer 6 function as indicating means.

The ROM 2 stores a bootstrap program which is a self initiated program, a character generator 2A for the printer 6, a character generator 2B for the display device 7 and a variety of control programs for controlling this machine, for example, as shown in FIG. 2. The character generator 2A, for the printer 6, is used, when code data indicating a character, a figure and/or a symbol such as ASCII CODE is converted into an image data representing the character, figure and/or symbol for the printer 6. The character generator 2B, for the display device 7 is employed, when the code data indicating a character, a figure and/or a symbol is converted into an image data representing the character, figure and/or symbol for the display device 7.

The external storage 4 has a problem issuing program area 4A for storing a problem issuing program relating to an electronic learning machine control procedure and a teaching material data file 4B for storing a plurality of problems data in relation with teaching material data having different levels of learning, difficulty level information indicating the difficulty level, and subject information indicating the subject matter as shown in FIG. 10. The external storage 4 also has a scholastic achievement management program area 4C for storing a scholastic achievement management program relating to the electronic learning machine control procedure, and a scholastic achievement management file 4D for storing scholastic achievement information, to include the student's school year, class and name, relating to scholastic achievement concerning a plurality of students. The scholastic achievement management file 4D functions as a first storage means and the teaching material data file 4B functions as a second storage means. The scholastic achievement management program stored in the scholastic achievement management program area 4C comprises programs including data for displaying an image data on the display device 7 as shown in FIGS. 5, 6 and 7, respectively, in cooperation with the character generator 2B. The data, the information and the program stored in the external storage 4 consist of code data for the characters, figures and symbols.

The RAM 3 has a problem issuing program area 3A for storing a problem issuing program and a teaching material data working area 3B for storing the teaching material data shown in FIG. 10. The RAM 3 further has a scholastic achievement management program area 3C for storing a scholastic achievement management program, a scholastic achievement data working area 3D for storing a scholastic achievement data and an input information working area 3E for storing information entered by operating the keyboard 5.

The RAM 3 further has a data edit area 3F for storing an editing teaching material image information to be given to the printer 6 or the display device 7 after image data are formed on the basis of the character generators 2B and 2A and the stored data, information and programs in the external storage 4. The RAM 3 has a visual RAM area 3G for storing a predetermined amount of the edited teaching material image information obtained from the data edit area 3F and providing the edited teaching material image information to the display device 7. The bootstrap program stored in the ROM 2 is a program for reading programs stored in the problem issuing program area 4A and scholastic achievement management program area 4C of the external storage 4 and writing the programs in the problem issuing program area 3A and the scholastic achievement management program area 3C, respectively, when the electronic teaching machine 5 is connected to a power source 8, i.e., the power source setting key 50 is turned on.

The problem issuing program stored in the problem issuing program area 3A of the RAM comprises programs for displaying image data, as shown in FIGS. 3, 8 and 11, on the screen, respectively, and operates in cooperation with the character generator 2B, for the display device 7, and a table as shown in FIG. 9. The scholastic achievement management program area 3C of the RAM comprises programs for displaying an image data, as shown in FIGS. 4 through 7, and corporates with the character generator 2B, for the display device 7.

The teaching material data working area 3B of the RAM 3 stores the teaching material data output from the teaching material data file 4B according to the problem issuing program stored in the problem issuing program area 3A. The data of the scholastic achievement management file 4D are written in the scholastic achievement data working area 3D according to the scholastic achievement management program stored in the scholastic achievement management program area 3C. If the scholastic achievement data written in the scholastic data working area 3D are changed and new data is added thereto, the scholastic achievement data of the scholastic achievement management file 4D are updated according to the scholastic achievement management program stored in the scholastic achievement management program area 3C.

The CPU 1 controls operation of the machine in accordance with the programs stored in the ROM 2, the problem issuing program area 3A and the scholastic achievement management program area 3C of the RAM 3 and the data stored in the teaching material data working area 3B, the scholastic achievement data working area 3D, the input information working area 3E, the data edit area 3F and the visual RAM area 3G of the RAM 3.

Operation of the electronic learning machine, as applied to learning mathematics, will be described hereinafter with reference to FIG. 2.

Upon connection of the electronic learning machine to the power source 8 by turning on the power source setting key 50, the programs stored in the problem issuing program area 4A and the scholastic achievement management program area 4C are written in the problem issuing program area 3A and the scholastic achievement management program area 3C, respectively, according to the bootstrap program stored in the ROM 2. The problem issuing program stored in the area 3A is read and displayed data therefrom is sent to the visual RAM area 3G through the data edit area 3F to be displayed on the screen of the display device 7 as shown in FIG. 3. FIG. 3 shows a function select menu including items for scholastic achievement management and problem issuance.

A query is made to see if the scholastic achievement management function has been selected, by moving the menu cursor to highlight that label, by means of the cursor movement keys 52 and pressing the enter key 54 in step S1. If the response in step S1 is yes, then a menu requesting entry of a student identification number is displayed on the screen of the display device 7. In step S2, the numeric keys 55 are operated to enter the student identification number, as shown in FIG. 4. The student identification number data is stored in the input information working area 3E.

Using a student identification number of "3110", for this explanation, when the enter key 54 is pressed after entering the student identification number "3110" using the numeric keys 55, student information and scholastic achievement information concerning the student are fetched from the scholastic achievement management file 4D of the external storage 4. The student information and the scholastic achievement information are written to the scholastic achievement data working area 3D and sent to the visual RAM area 3G through the data edit area 3F, to be displayed on the display screen 7 in Step S3. If information corresponding to the specified student identification number is not stored in the external storage 4, no information is displayed (FIG. 5).

After the numeric keys 55 and enter key 54 are pressed to obtain the student's scholastic achievement information, the data in the scholastic achievement management file 4D are changed and/or new data is added thereto, as appropriate, in step S4 according to the scholastic achievement management program stored in the scholastic achievement management program area 3C.

If the information corresponding to the specified student identification number is stored in the external storage 4, the numeric keys 55 and the character keys 56 may be operated to enter changes to the information concerning the student identified by the student identification number, such as the school year, the class and the student's name. To select the input items to be changed, such as the school year, the class and the scholastic achievement, the menu cursor is moved by operating the cursor movement keys 52. The student information and the scholastic achievement information stored in the scholastic achievement data working area 3D can be changed by entering new student information and new scholastic achievement information. FIGS. 6 and 7 are examples of tables showing student information and scholastic achievement information concerning the students "3110" and "3111", respectively. When the enter key 54 is pressed after entering the updated student information and the scholastic achievement information, the student information and the scholastic achievement information are stored in the scholastic achievement data working area 3D and then the contents of the scholastic achievement management file 4D of the external storage 4 are updated according to the data of the scholastic achievement data working area 3D.

If the problem issuance function is selected from the function select menu, shown in FIG. 3, then the response in step S1 is no. A query is the made to see if the problem issuance function has been selected by moving the menu cursor, using the cursor movement keys 52 to highlight "Problem Issuance", and pressing the enter key 54 in step S5. If so, the response in step S5 is yes. Then, a problem output specifying menu is displayed on the screen of the display device 7. FIG. 8 shows the problem output specifying, or Problem Request, menu in a state after input data has been entered.

The numeric keys 55 are operated to enter the student identification numbers and subject codes, as shown in FIG. 8, in step S6. The items of the Problem Request Menu to be entered are selected by moving the menu cursor with the cursor movement keys 52 prior to entry of the data. After entry, the student identification numbers and the subject codes are stored in the input information working area 3E. In FIG. 8, for purposes of illustration, the input student identification numbers are "3110" and "3111" and the input subject codes are "0301" and "0305". The operation for storing the student identification numbers and the subject codes is completed by pressing the enter key 54. Then, step S7 is executed.

In step S7, the scholastic achievement information for the first student identification number "3110" and the second student identification number are read (selected) from the scholastic achievement management file 4D and stored in the scholastic achievement management data working area 3D. The grades of the scholastic achievement of the student number "3110" in the subjects represented by the subject codes "0301" and "0305" are "4" executed by the CPU 1, functions as a selecting means.

In step S8, the appropriate difficulty levels of teaching materials are determined with reference to a table of grades and corresponding difficulty levels (FIG. 9) and the selected scholastic achievement information obtained in step S7. This step S8, executed by the CPU 1, functions as a control means.

Since the grade of the student identified by the student identification number "3110" for the subject code "0301" is "4", the difficulty level is "3". Thus, teaching material data corresponding to the subject code "0301" and the difficulty level "3" is retrieved (selected) from the teaching material data file 4B (shown in FIG. 10). The teaching material data, which functions as problem data, is stored in the teaching material data working area 3B. In this case, teaching material data for problem numbers "0301", "0302", "0303" and "0304" at difficulty level "3" for the subject code "0301" are found in the file.

In step S9, a query is made to see if there are any unprocessed subject codes. The response in step S9 is yes because a subject code "0305" for the student specified by the student identification number "3110" has not yet been processed. The program returns to step S8 to read teaching material data for the subject code "0305". The grade of the student "3110" for the subject code "0305" is "3" (FIG. 6). Therefore, the difficulty level of teaching material data for the subject code "0305" for the student "3110" is "2" (FIG. 9). Thus, teaching material data for the subject code "0305" of the difficulty level "2" is retrieved from the teaching material data file 4B (FIG. 10), is stored in the teaching material data working area 3B, and then step S9 is executed again. This time, the response in step S9 is no, namely, there is no unprocessed subject code for student identification number "3110" and the program advances to step S10. In step S10, a query is made to see if there is an unprocessed student identification number. As student identification number "3111" has not been processed, the response in step S11 is yes and the program returns to step S8.

In step S8, difficulty levels for teaching materials are determined for the second student identification number "3111" with reference to the table shown in FIG. 9 and the scholastic achievement information obtained in step S7. Since the grade of the student number "3111" for the subject code "0301" is "2" (FIG. 7), the difficulty level is "1" (FIG. 9). Then, teaching material data corresponding to the subject code "0301" and the difficulty level "1" is retrieved from the teaching material data file 4B (FIG. 10) and is stored in the teaching material data working area 3B. In this case, teaching material data of problems of a difficulty level "1", identified by problem numbers "0101", "1002", and "0103", are stored in the teaching material data working area 3B and the program advances to step S9.

In step S9, a query is made to see if there remains any unprocessed subject codes. Since a subject code "0305" has not yet been processed, the program returns to step S8 to read teaching material data for the subject code "0305"

The grade of the student number "3111" for the subject code "0305" is "3" (FIG. 7) and the difficulty level for the subject code "0305" is "2" (FIG. 9). Thus, teaching material data corresponding to the subject code "0305" and the difficulty level "2" is retrieved from the teaching material data file 4B (FIG. 10) and stored in the teaching material data working area 3B. In this case, teaching material data of a problem identified by a problem number "0222" is stored in the teaching material data working area 3B. Then, step S9 is executed. Since there are no unprocessed subject codes left, the program advances to step S10.

In step S10, a query is made to see if there are any unprocessed student identification numbers. In our example, the response in step S10 is no and the program advances to step S11. Thus, each identified student has a file of problems created for each identified subject prior to the program advancing to step S11.

In step S11, the operator, such as a teacher or administrator, selects either a display mode, in which the teaching material data, retrieved from the teaching material data file 4B of the external storage 4 in step S8 and stored in the teaching material data working area 3B, is displayed on the display screen 7 or a print mode, in which the same teaching material data is printed by the printer 6.

If the display mode is selected (YES in the step S11), the teaching material data stored in the teaching material data working area 3B is converted into image information and the image information is displayed on the display screen 7 in step S12 so that it may be reviewed by the operator. A scroll key 53 is used to scroll a page on the screen of the display device 7 as shown in FIG. 12. A cancel key 57 is pressed to quit the display of the teaching material data and to return to the panel shown in FIG. 3.

If the print mode is selected (NO in the step S11), the teaching material data stored in the teaching material data working area 3B is converted into image information and sent to the printer 6 to be printed in a format as shown in FIGS. 13 and 14. After all the teaching material image data has been printed out, the display returns to the panel shown in FIG. 3.

If in step S5, a no determination has been made and the menu cursor is positioned on the menu item "End", by use of the cursor movement keys 52, and then the enter key 54 is pressed, the operation is ended, or stopped, in step S14.

Although the invention has been described in its preferred form with a certain degree of particularity, obviously many changes and variations are possible therein. It is therefore to be understood that the invention may be practiced otherwise than as specifically described herein without departing from the scope and spirit thereof.

What is claimed is:

1. An electronic learning machine, comprising:

input means for inputting data relating to a specific student including scholastic achievement by subject area;

first storage means for storing scholastic achievement data relating to scholastic achievements of a plurality of students including the specific student;

selecting means for selecting scholastic achievement data relating to the scholastic achievements of the specific student from the first storage means in accordance with the data input by the input means;

second storage means for storing a plurality of problems data for at least one subject area relating to learning problems having different levels of learning in relation to difficulty level information which indicates difficulty level of learning concerning the learning problems;

indicating means for indicating the learning problem information relating to the learning problems; and control means for selecting learning problem information relating to the learning problems and matching the specific student's scholastic ability and giving the data relating to the selected learning problems to the indicating means in accordance with the difficulty level information and the selected data by the selecting means.

2. The electronic learning machine as claimed in claim 1, wherein the learning problem information is related with at least one subject information indicating at least one subject area.

3. The electronic learning machine as claimed in claim 2, wherein the learning problem information includes problem data indicating problem number and teaching material data indicating teaching material of learning.

4. The electronic learning machine as claimed in claim 1, wherein said indicating means comprises at least one of a display device and a printer.

5. The electronic learning machine as claimed in claim 4, wherein said control means gives the data relating to the selected learning problems to one of a display device and a printer.

6. The electronic learning machine as claimed in claim 1, wherein said input means inputs data relating to a specific student and subject of learning.

7. The electronic learning machine as claimed in claim 1, wherein said input means inputs a plurality of data relating to the specific student and the subject area and said selecting means selects scholastic achievement data relating to the scholastic achievements of the specific student and the subject area from said first storage means in accordance with the input data by said input means.

8. The electronic learning machine as claimed in claim 1, wherein the stored scholastic achievement data in said first storage means is changed.

9. The electronic learning machine as claimed in claim 1, wherein a table for entering the student's scholastic achievement information is stored in said second storage means.

10. An electronic learning machine, comprising:

an input means for inputting data and initiating system operation;

an internal storage means for storing working programs and working data;

an external storage means for storing evaluation data for at least one subject area and level of difficulty, student achievement data by subject area and operating programs;

a printer;

a display means; and a controller means for electronically linking the input means, the internal storage means, the external storage means, the printer and the display means and for directing their operation, wherein said controller means selects evaluation data by subject area and level of difficulty from said external storage means for each student and subject area identified through use of said input means, and outputs to one of a display and a printed paper the evaluation data by subject area and level of difficulty for each said student in the selected subject area, said evaluation data having a level of difficulty appropriate to student achievement in each of said selected subject areas.

11. The electronic learning machine as claimed in claim 10, wherein said input means is used for inputting student achievement data and changing student achievement data.

12. The electronic learning machine as claimed in claim 11, wherein the input and changed student achievement data updates both the internal and external storage means.

13. The electronic learning machine as claimed in claim further comprising a comparison table for associating student achievement with level of difficulty.

* * * * *